March 18, 1930.  L. E. LA BRIE  1,750,673
RIM FOR VEHICLE WHEELS
Original Filed Oct. 15, 1923
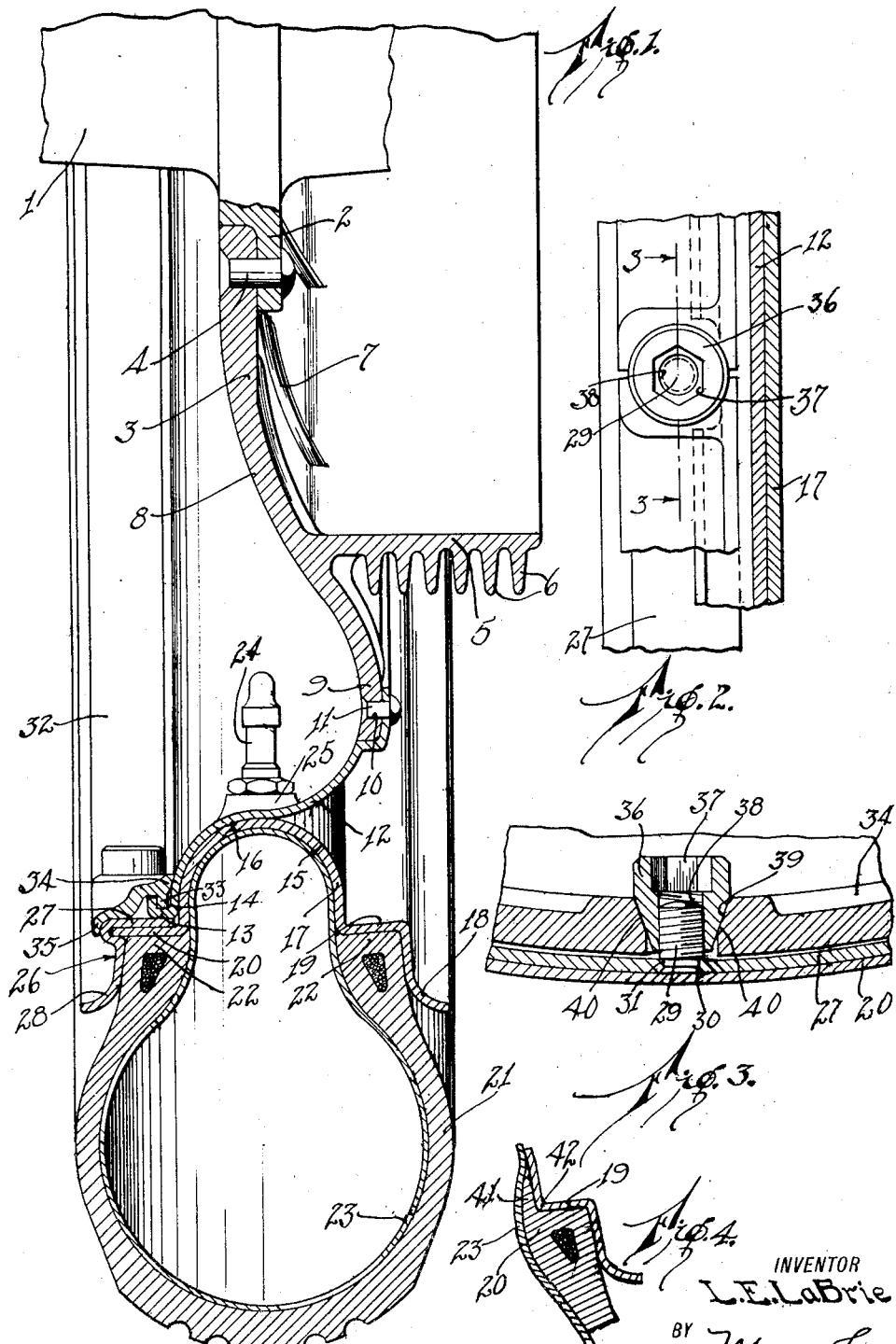
INVENTOR
L.E.LaBrie
BY
ATTORNEYS Patented Mar. 18, 1930

1,750,673

UNITED STATES PATENT OFFICE

LUDGER E. LA BRIE, OF CHICAGO, ILLINOIS, ASSIGNOR TO MOTOR INDUSTRIES, INC., OF CHICAGO, ILLINOIS, A CORPORATION OF ILLINOIS

RIM FOR VEHICLE WHEELS

Application filed October 15, 1923, Serial No. 668,709. Renewed August 22, 1925.

My invention relates to improvements in rims for vehicle wheels, and particularly to that type of vehicle wheel intended to carry a pneumatic tire, and it consists in the combinations, constructions and arrangements herein described and claimed.

An object of my invention is to provide a vehicle wheel of the type described having a rim construction which permits the use of a pneumatic tire casing of the standard size, but provided with an inner tube for a greater cubical content than the casing itself. It is therefore possible to employ a type of pneumatic casing now in common use, yet to obtain riding qualities brought about only by the use of over-size casings which are more expensive than the standard sizes.

A further object of my invention is to provide a vehicle wheel of the type described in which the rim is so constructed as to permit the use of a larger inner tube than the conventional casing is adapted for, thereby greatly increasing the resiliency of the tire.

A further object of my invention is to provide a vehicle wheel in which the area of contact of the inner tube with the wheel rim is greatly increased, thereby facilitating the conduction of heat from the tube and maintaining the tube in a substantially cool condition, a condition most desirable to the prolongation of life to the tube.

A further object of my invention is to provide a vehicle wheel of the type described having a rim of particularly novel construction in which a ring is expanded outwardly to secure the tire casing from dislodgment upon the peripheral rim proper.

A further object of my invention is to provide a vehicle wheel of the type described in which the air valve is more readily accessible than in the ordinary type of disc vehicle wheel.

A further object of my invention is to provide a vehicle wheel of the type described that is simple in construction, extremely durable, and is fairly practical commercially.

Other objects and advantages will appear in the following specification, and the novel features of the invention will be particularly pointed out in the appended claims.

My invention is illustrated in the accompanying drawings forming part of this application, in which Figure 1 is a sectional view of an embodiment of my invention, Figure 2 is a sectional view of a tire retaining ring mechanism, Figure 3 is a sectional view along the line 3—3 of Figure 2, and Figure 4 is a fragmentary sectional view of a modified form of the tire casing.

In carrying out my invention I make use of the ordinary type of wheel hub 1 having a flange 2 extending radially therefrom, upon which a light aluminum or aluminum alloy disc 3 is mounted by means of rivets 4. This disc 3 is provided on its rear wall with an integral brake drum 5 having radially extending fins 6 on the outer peripheral wall thereof for cooling the drum. The rear wall of the disc 3 within the drum 5 has a plurality of radially extending ribs 7 thereupon for the purpose of lending rigidity to this portion of the disc.

The disc 3 curves laterally toward the rear wall thereof as shown at 8, and is curved at its outer edge 9 so as to lie in a substantially vertical plane when the hub is upon a horizontal axis. The disc 3 is provided with a plurality of openings 10 adjacent the peripheral edge thereof through which rivets 11 are projected for the purpose of securing a light, relatively thin metal rim or supporting collar 12. This collar 12 is fashioned with its outer wall contiguous with the outer wall of the disc 3 and is arranged to curve outwardly beyond the outermost wall of the disc 3. The collar 12 terminates in a laterally bent portion 13 forming a central circumferential groove on the outer wall of the collar 12. I shall hereinafter refer to this groove so formed as groove 14.

A tire supporting rim 15 is secured to the collar 12 by means of welding at 16. This tire supporting member 15 has a deeply depressed portion 17 at the mid point thereof concentric with the hub 1. The rear wall of the rim 15 is provided with a curved side wall 18 at its outer edge and both of the casing supporting walls 19 and 20 are inclined inwardly at their outer edges, (see Figure 1).

A standard tire casing 21 is supported upon the rim 15 so that the bead portions 22 thereof rest directly upon the inclined portions 19 and 20 of the rim 15.

An inner tube 23 is disposed within the casing 21. This inner tube is larger in sectional area than the casing 21 and is permitted to project into the recess 17 and to contact with the inner wall of the recess. A suitable valve 24 is of standard construction, and is provided for the tube 23 and is projected through a central opening disposed in a boss 25 forming a part of the collar 12.

Means for retaining the casing 21 against dislodgment from the rim 15 is provided in a split retaining ring 26 having one wall 27 arranged to lie in close engagement with the inner surface of the wall 20 of the rim 15, and having its side wall 28 curved outwardly as in the case of the side wall 18. The inner side of the wall 20 of the rim 15 is provided with a single inwardly extending stud bolt 29 securely fixed thereto (see Figure 3). The ring 26 is disposed adjacent the inner side wall 20 so that the split portion thereof may be in registration with the tapered base 30 of the stud bolt 29. It should be noted that the adjacent edges 31 of the split ring 26 are tapered to conform with the curvature of this tapered portion 30 of the stud bolt.

Means for locking the retaining ring 26 against movement relative to the rim 15 and thereby locking the casing 21 in operative position is provided in an expanding split ring 32 having an outwardly extending flange 33 on its inner wall arranged to be received in the groove 14 of the collar 12. Other portions 34 and 35 of the ring 32 are arranged to closely contact with the collar 12 and retaining ring 26 respectively, (see Figure 1).

The particular locking means employed for securing the ring 32 in place is more fully illustrated in Figures 2 and 3, and consists of an especially constructed locking nut 36 having an angular bore 37 in the wall thereof for receiving the angular work engaging member of a socket wrench. The nut 36 is provided with an interiorly threaded bore 38 arranged to engage with the stud bolt 29. The outer wall of the nut 36 is tapered as shown at 39 and the adjacent edges 40 of the split locking member 32 (see Figure 2) are tapered to receive the tapered portion 39 of the locking nut, whereby tightening of the nut 36 may occasion the expansion of the split locking ring 32 to cause the retaining ring 26 to be held in tight engagement with the rim 15.

From the foregoing description of the various parts of the device, the operation thereof may be readily understood. In use my improved vehicle wheel employs the ordinary standard type size of vehicle casing, and yet an inner tube having the cubical contents of a casing greatly larger than the casing employed. This structure lends all of the resiliency attained by use of the larger casing to my improved wheel, and heat generated by the traction of the wheel upon the road is conducted directly from the tube to the cooler metal rim 15, thereby eliminating the dangers which arise to rubber tires and casings from slow vulcanizing brought about by the heat from constant traction.

My improved vehicle tire does not necessitate the employment of a separate brake drum since the brake drum 5 is formed as an integral part of the wheel, being a part of the disc 3. This construction means that in operation the braking force exerted by the application of the brake bands of the drum is imparted directly to the wheel and not from a drum forming a separate part and connected by some such means as bolts or the like. In the latter instance, bolts often come loose and strain the wheel, whereas in my improved wheel, this occurrence is impossible.

In removing the casing 21 with its tube 23, it is necessary to unfasten but one binding nut, i. e., the nut 36. When this nut has been removed from the stud bolt 29, the locking member 32 is contracted at its adjacent edges and drawn inwardly out of engagement with the groove 14, whereupon the ring is entirely removed from the wheel. The retaining ring 26 may now be drawn laterally out of engagement with the wheel and the casing easily removed, precisely in the same manner as the ordinary type of vehicle wheel.

In securing the casing 21 upon the rim, the retaining ring 26 is contracted and moved into engagement with the rim 15 as shown in Figure 1. The locking ring 32 is thereupon contracted and placed so that its radially extending flange 33 falls within the groove 14 of the collar 12. In tightening the nut 36 upon the stud bolt, the locking ring 32 will expand into close engagement with the collar 12 and the retaining ring 26 to lock the casing 21 securely in place.

In Figure 4 I have shown a modified form of the casing 21. This modified form is to take the place of the standard tire casing where the user wishes to preclude all possibility of pinching the tube between the casing and the rim as might occur with a partially deflated tube. The casing 21, as shown in Fig. 4, is provided with an inwardly extending member 41 on the bead 20 thereof, which member is arranged to extend inwardly from the portion 42 of the wall 19 of the rim 15 so that the tube 23 may not become pinched between the casing and the peripheral wall of the rim.

I claim:

1. In a motor vehicle wheel of the type described, a pneumatic tire carrying rim, a removable side wall for said rim, a collar for supporting said rim upon a disc wheel fashioned with a recess extending throughout its circumferential outer edge, a split locking ring arranged to contact a portion of said side wall, and partially received in the recess of said collar, a stud bolt extending radially inwardly from said removable side wall, and between adjacent ends of said split locking ring, and a nut having tapering side walls disposed upon said stud bolt, whereby said nut may be tightened on said bolt to expand said ring, and to lock said ring in close engagement with said collar and side wall respectively.

2. In a motor vehicle wheel of the type described, a pneumatic tire carrying rim, a removable side wall for said rim, a collar for supporting said rim upon a disk wheel fashioned with a recess extending throughout its circumferential outer edge, a split locking ring arranged to contact a portion of said side wall and partially received in the recess of the collar, and means to force the ends of the ring apart to expand the ring to lock the collar and side wall together.

3. In a motor vehicle wheel of the type described, a pneumatic tire carrying rim, a removable side wall for said rim, means supporting said rim and having a recess extending throughout its circumferential outer edge, a split locking ring arranged to contact a portion of said side wall and partially received in said recess, and means to force the ends of the ring apart to expand the ring.

4. Tire-carrying means comprising, in combination, a wheel part 12 having a groove 14 in its edge, a rim part 15 carried thereby and having a portion 20 spaced slightly from the edge of the wheel part to leave a space between them, a tire-holding member 26 having a flange 27 projecting into said space between the wheel and rim parts, and a locking ring engaging the tire-holding member and having a flange projecting into said groove 14.

5. Tire-carrying means comprising, in combination, a wheel part 12, a rim part 15 carried thereby and having a portion 20 spaced slightly from the edge of the wheel part to leave a space between them, a tire-holding member 26 having a flange 27 projecting into said space between the wheel and rim parts, and means engaging the tire-holding member and locking it to the wheel and rim parts.

6. In a tire supporting structure, a peripheral wheel part having an inwardly opening groove in its edge, a rim secured thereto provided with spaced shoulders, the wheel part and rim having superposed portions between said shoulders, said rim comprising a substantially radially extending flange extending from one shouldered portion and a detachable part co-operating with the other shouldered portion and a locking ring holding said detachable part and having a flange interlocking with said inwardly opening groove.

7. In a tire supporting structure, a wheel part having a groove in its edge, a rim secured thereto having spaced shoulders adapted to support the side walls of a tire casing, the rim having a depressed portion between said shoulders adapted to support an inflated inner tube and having a flange adapted to hold one side of a tire base, said rim also provided with a detachable part having a flange adapted to support one side of a tire casing, and a locking ring holding said detachable part and having a flange interlocking with said groove in the wheel part.

8. Tire carrying means comprising, in combination, a rim having a central depressed portion approximately semi-circular in cross-section and flanges extending laterally from said depressed portion, said flanges adapted to support the side walls of a tire casing, the rim depression adapted to nest an inflated inner tube, said rim having at one side a substantially radially extending tire supporting flange and at its other side a detachable ring adapted to support one side of a tire casing, said ring provided with a part fitting under one laterally extending flange, and radially expansible means for locking the detachable ring in place.

LUDGER E. LA BRIE.